US011973403B2

(12) United States Patent
Okamoto et al.

(10) Patent No.: US 11,973,403 B2
(45) Date of Patent: Apr. 30, 2024

(54) VARIABLE-SPEED ACCELERATOR AND A METHOD FOR STARTING VARIABLE-SPEED ACCELERATOR

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Kobayashi, Hiroshima (JP); Hiroyuki Miyata, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 172 days.

(21) Appl. No.: 17/648,367

(22) Filed: Jan. 19, 2022

(65) Prior Publication Data
US 2022/0252139 A1     Aug. 11, 2022

(30) Foreign Application Priority Data

Feb. 9, 2021   (JP) .................................. 2021-018837

(51) Int. Cl.
*H02K 7/18*      (2006.01)
*H02K 7/118*     (2006.01)
*H02P 27/06*     (2006.01)
*F16H 37/10*     (2006.01)

(52) U.S. Cl.
CPC .............. *H02K 7/118* (2013.01); *H02P 27/06* (2013.01); *F16H 2037/102* (2013.01)

(58) Field of Classification Search
CPC .......... H02K 16/00; H02K 7/118; H02P 1/56; H02P 27/06; H02P 5/747; H02P 9/00; F16H 2037/102
See application file for complete search history.

(56) References Cited

U.S. PATENT DOCUMENTS

| 11,060,587 | B1* | 7/2021 | Kobayashi | .............. F16H 57/10 |
| 2017/0141706 | A1* | 5/2017 | Kobayashi | .............. H02K 7/003 |
| 2018/0138836 | A1 | 5/2018 | Lauter et al. | |
| 2018/0187778 | A1* | 7/2018 | Okamoto | ............... H02K 7/116 |
| 2018/0245671 | A1* | 8/2018 | Okamoto | .................. H02P 1/58 |

(Continued)

FOREIGN PATENT DOCUMENTS

| EP | 3299678 A1 | 3/2018 |
| WO | 2017/217483 A1 | 12/2017 |

*Primary Examiner* — Naishadh N Desai
(74) *Attorney, Agent, or Firm* — Osha Bergman Watanabe & Burton LLP

(57) ABSTRACT

The variable-speed accelerator includes an electric device, a transmission device, and a power supply portion that supplies electric power of a constant rated frequency supplied from a power supply to the electric device when the electric device is started. The electric device includes a constant-speed electric motor that rotates a constant-speed input shaft of the transmission device, and a variable-speed electric motor that functions as a generator in a generator mode and also functions as an electric motor in an electric motor mode. When starting the electric device, the power supply portion supplies the electric power generated by the variable-speed electric motor in the generator mode to the constant-speed electric motor after supplying starting power to the constant-speed electric motor and the variable-speed electric motor.

2 Claims, 6 Drawing Sheets

(56) References Cited

U.S. PATENT DOCUMENTS

| | | | |
|---|---|---|---|
| 2018/0252300 A1* | 9/2018 | Okamoto | F16H 3/728 |
| 2019/0113111 A1* | 4/2019 | Okamoto | H02K 7/108 |
| 2019/0181779 A1* | 6/2019 | Okamoto | F16H 3/724 |
| 2019/0226557 A1* | 7/2019 | Okamoto | F16H 3/724 |
| 2019/0264779 A1* | 8/2019 | Okamoto | F16H 1/2827 |

* cited by examiner

VARIABLE-SPEED ACCELERATOR AND A METHOD FOR STARTING VARIABLE-SPEED ACCELERATOR

BACKGROUND OF THE INVENTION

Field of the Invention

The present disclosure relates to a variable-speed accelerator and a method for starting a variable-speed accelerator.

Priority is claimed on Japanese Patent Application No. 2021-018837, filed on Feb. 9, 2021, the content of which is incorporated herein by reference.

Description of Related Art

PCT International Publication No. WO 2017/217483 discloses a configuration including an electric device having a constant-speed electric motor and a variable-speed electric motor, and a planetary gear transmission device, as a variable-speed accelerator for driving a rotary machine, such as a compressor. The constant-speed electric motor rotates a constant-speed shaft to generate a rotation driving force. The constant-speed shaft rotates a constant-speed input shaft of the planetary gear transmission device. The variable-speed electric motor rotates a variable-speed rotor. The variable-speed rotor rotates a variable-speed input shaft of the planetary gear transmission device.

The planetary gear transmission device shifts and transmits the rotation driving force transmitted to the constant-speed input shaft and the variable-speed input shaft to the rotary machine. In the variable-speed accelerator having such a configuration, the rotation speed of an output shaft of the transmission device connected to the rotary machine is changed by changing the rotation speed of the variable-speed electric motor.

SUMMARY OF THE INVENTION

However, in the configuration described in PCT International Publication No. WO 2017/217483, when the variable-speed accelerator is started, and when the constant-speed electric motor is started, there is a case where a large starting power that exceeds the rated power is generated. As a result, there is a case where a disturbance such as a voltage drop occurs in a power supply system such as a commercial power supply that supplies electric power to a constant-speed electric motor.

The present disclosure provides a variable-speed accelerator capable of suppressing an increase in starting power and suppressing an influence on a power supply system when starting a variable-speed accelerator, and a method for starting a variable-speed accelerator.

According to an aspect of the present disclosure, there is provided a variable-speed accelerator including: an electric device that configured to generate a rotation driving force; a transmission device that configured to shift the rotation driving force transmitted from the electric device to a constant-speed input shaft and a variable-speed input shaft and configured to transmit the shifted rotation driving force to a driving target via an output shaft; and a power supply portion that configured to supply electric power having a constant rated frequency supplied from a power supply to the electric device when the electric device is started, in which the electric device includes a constant-speed electric motor having a constant-speed rotor that configured to rotate the constant-speed input shaft of the transmission device, a variable-speed electric motor that has a variable-speed rotor connected to the variable-speed input shaft of the transmission device, functions as a generator in a generator mode, and functions as an electric motor in an electric motor mode, and the power supply portion is connected to the constant-speed electric motor and the variable-speed electric motor, and when the electric device is started, the power supply portion supplies electric power generated by the variable-speed electric motor in the generator mode to the constant-speed electric motor, after starting power is supplied to the constant-speed electric motor and the variable-speed electric motor.

According to another aspect of the present disclosure, there is provided a method for starting the above-described variable-speed accelerator, the method including: a step of supplying electric power generated by the variable-speed electric motor in the generator mode to the constant-speed electric motor, after supplying the electric power to the constant-speed electric motor and the variable-speed electric motor from the power supply portion; and a step of supplying the electric power to the constant-speed electric motor from only the power supply.

According to the variable-speed accelerator and the method for starting a variable-speed accelerator of the present disclosure, when starting the variable-speed accelerator, it is possible to suppress an increase in the starting power and suppress the influence on the power supply system.

DETAILED DESCRIPTION OF THE INVENTION

Hereinafter, embodiments for implementing a variable-speed accelerator and a method for starting a variable-speed accelerator according to the present disclosure will be described with reference to the attached drawings. However, the present disclosure is not limited only to the embodiment.

(Configuration of Variable-Speed Accelerator)

Figure 1:
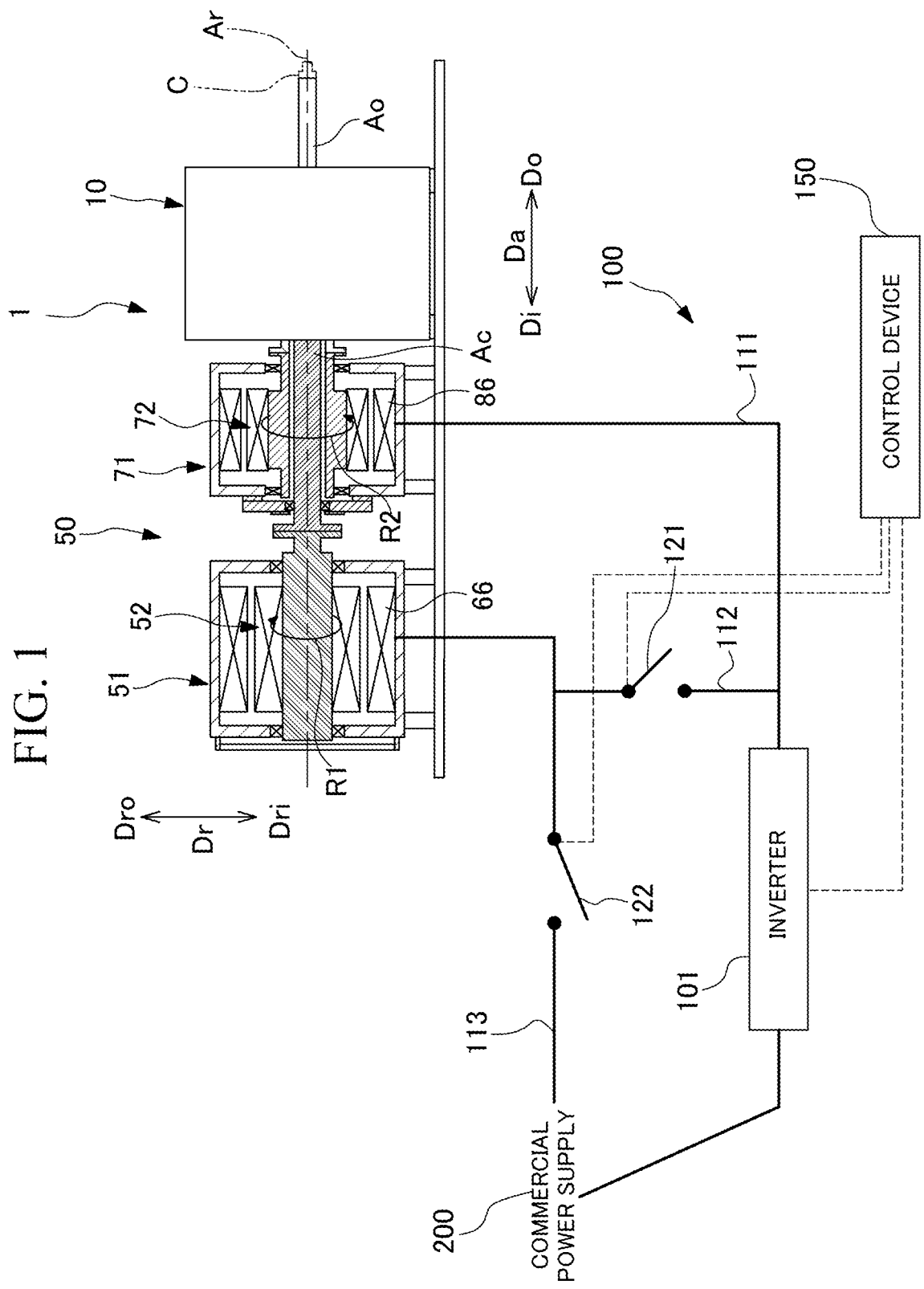
FIG. 1 is a view showing a configuration of a variable-speed accelerator according to an embodiment of the present disclosure.

As shown in FIG. 1, a variable-speed accelerator 1 according to the embodiment includes an electric device 50 that generates a rotation driving force; a transmission device 10 that shifts the rotation driving force generated by the electric device 50 and transmits the shifted rotation driving force to a driving target; and a power supply portion 100.

The variable-speed accelerator 1 can be employed to, for example, a fluid mechanical system, such as a compressor system. The variable-speed accelerator 1 is laid in advance in an area where the variable-speed accelerator 1 is installed, such as a factory, and is driven by electric power supplied from a commercial power supply (power supply) 200 capable of supplying electric power having a constant rated frequency. The variable-speed accelerator 1 and the commercial power supply 200 form a part of the fluid mechanical system. The driving target of the variable-speed accelerator 1 of the embodiment is, for example, a compressor C.

The electric device 50 includes a constant-speed electric motor 51 having a constant-speed rotor 52 which rotates at a constant-speed; and a variable-speed electric motor 71 having a variable-speed rotor 72 that rotates at any rotation speed. The constant-speed rotor 52 and the variable-speed rotor 72 are each connected to the transmission device 10.

The constant-speed electric motor 51 is supported by a frame 90 by a constant-speed electric motor support portion 51S. The variable-speed electric motor 71 is supported by the frame 90 by a variable-speed electric motor support portion 71S. The transmission device 10 is supported by the frame 90 by a transmission device support portion 10S. These support portions make it possible to reliably fix the electric device 50 and the transmission device 10 which are heavy objects.

The transmission device 10 shifts the rotation driving force generated by the electric device 50 and transmits the shifted rotation driving force to the driving target. The transmission device 10 of the present embodiment is a planetary gear transmission device having a plurality of planetary gears (not shown) configured with external gears and internal gears, or sun gears (not shown). The transmission device 10 has a constant-speed input shaft Ac that rotates at a constant-speed by a driving force of the constant-speed electric motor 51, and a variable-speed input shaft Av that rotates at any rotation speed by a driving force of the variable-speed electric motor 71. The constant-speed input shaft Ac is disposed in a state of being inserted into the variable-speed input shaft Av having a cylindrical shape. The transmission device 10 shifts the rotation driving force obtained by the constant-speed input shaft Ac rotated at a constant-speed in the constant-speed electric motor 51 and the variable-speed input shaft Av of which the rotating speed is controlled in the variable-speed electric motor 71, by the gear, and transmits the shifted rotation driving force to an output shaft Ao. In other words, in the variable-speed accelerator 1, by changing the rotation speed of the variable-speed electric motor 71, it is possible to change the rotation speed of the output shaft Ao of the transmission device 10 connected to a driving target.

Hereinafter, the direction in which the axial line Ar extends is referred to as an axial direction Da. One side of the axial direction Da in the variable-speed accelerator 1 is an output side Do, and the opposite side of the output side Do is an input side Di. In addition, a radial direction around the axial line Ar is simply referred to as a radial direction Dr. In the variable-speed accelerator 1 of the present embodiment, the electric device 50 is disposed on the input side Di in the axial direction with respect to the transmission device 10. Further, the transmission device 10 is disposed on the output side Do with respect to the electric device 50. The compressor C is disposed on the output side Do of the variable-speed accelerator 1.

Figure 2:
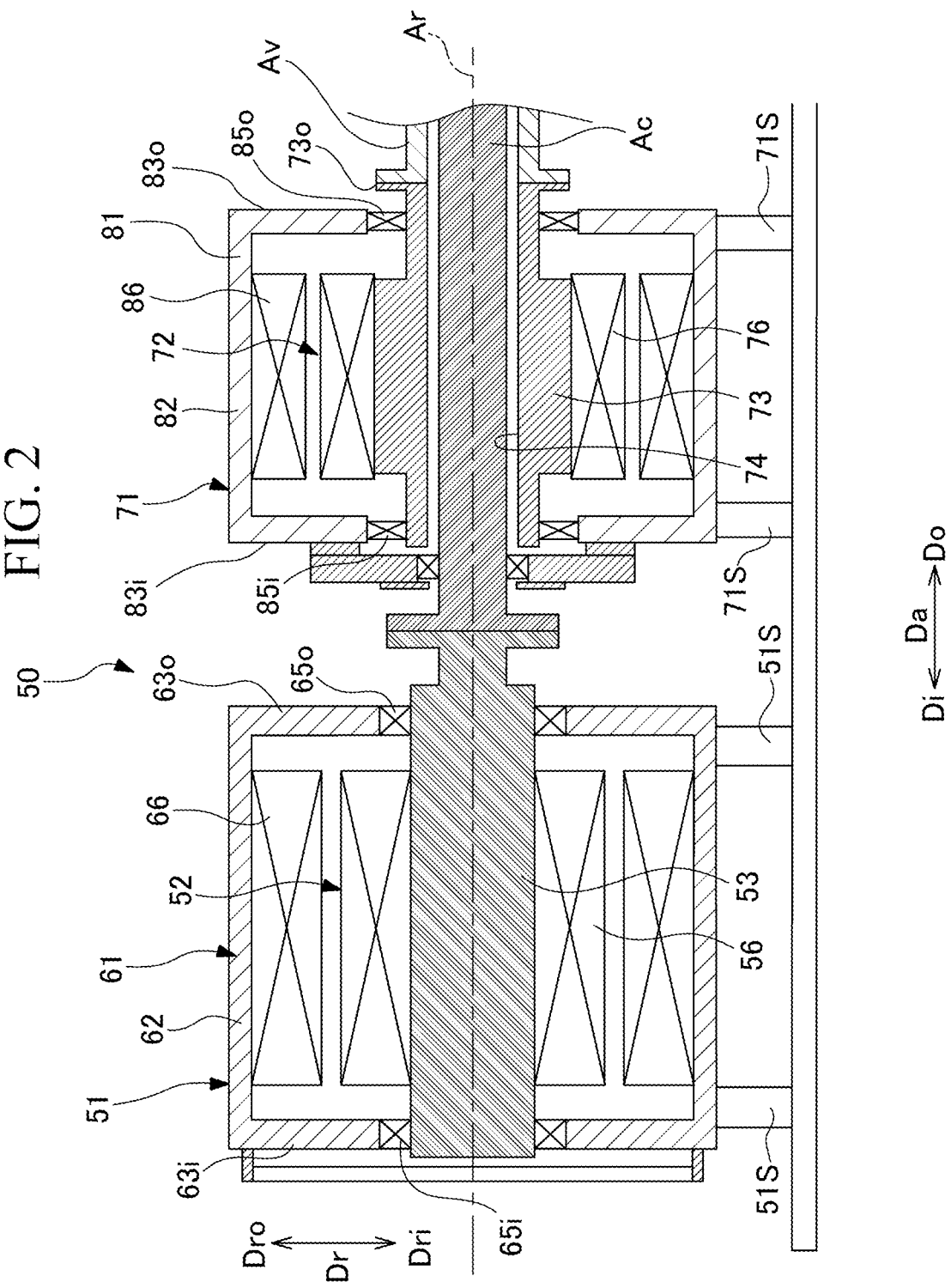
FIG. 2 is a sectional view showing a configuration of an electric device of the variable-speed accelerator.

As shown in FIG. 2, the constant-speed electric motor 51 has a constant-speed rotor 52 that turns around the axial line Ar and is connected to the constant-speed input shaft Ac of the transmission device 10; and a constant-speed electric motor casing 61.

The constant-speed rotor 52 includes a constant-speed rotor shaft 53 which forms a columnar shape around the axial line Ar, and a conductor 56 which is fixed to the outer periphery of the constant-speed rotor shaft 53.

The constant-speed stator 66 is disposed on an outer side Dro of the conductor 56 of the constant-speed rotor 52 in the radial direction Dr. The constant-speed stator 66 is formed of a plurality of coils.

The constant-speed electric motor casing 61 has a constant-speed electric motor casing main body 62 which has a cylindrical shape around the axial line Ar, and in which a constant-speed stator 66 is fixed on the inner peripheral side; and lids 63*i* and 63*o* that close both ends of the axial direction Da of the constant-speed electric motor casing main body 62 having a cylindrical shape. Constant-speed rotor bearings 65*i* and 65*o* which support the constant-speed rotor shaft 53 to be turnable around the axial line Ar, are attached to each of the lids 63*i* and 63*o*.

The input side end of the constant-speed rotor shaft 53 protrudes to the input side from the input side lid 63*i* of the constant-speed electric motor casing 61.

The variable-speed electric motor 71 has the variable-speed rotor 72 that turns around the axial line Ar and is connected to the variable-speed input shaft Av; a variable-speed stator 86 disposed on the outer peripheral side of the variable-speed rotor 72; and a variable-speed electric motor casing 81 in which the variable-speed stator 86 is fixed to the inner peripheral side.

The variable-speed rotor 72 includes a variable-speed rotor shaft 73 and a conductor 76 which is fixed to the outer periphery of the variable-speed rotor shaft 73. The variable-speed rotor shaft 73 has a cylindrical shape around the axial line Ar and has a shaft insertion hole 74 which penetrates in the axial direction Da. The constant-speed input shaft Ac is inserted through the shaft insertion hole 74 of the variable-speed rotor shaft 73. At the output side end of the variable-speed rotor shaft 73, a flange 73*o* having an annular shape that expands toward the outer side Dro in the radial direction Dr is formed.

The variable-speed stator 86 is disposed on the outer side Dro of the conductor 76 of the variable-speed rotor 72 in the radial direction Dr. The variable-speed stator 86 is formed of a plurality of coils.

The variable-speed electric motor casing 81 has a variable-speed electric motor casing main body 82 which has a cylindrical shape around the axial line Ar, and in which the variable-speed stator 86 is fixed on the inner peripheral side; an output side lid 83*o* that closes the output side end of the variable-speed electric motor casing main body 82 having a cylindrical shape; and an inlet side lid 83*i* disposed on the input side of the variable-speed stator 86 and fixed to the inner peripheral side of the variable-speed electric motor casing main body 82 having a cylindrical shape. Variable-speed rotor bearings 85*i* and 85*o* which support the variable-speed rotor shaft 73 to be turnable around the axial line Ar, are attached to each of the inlet side lid 83*i* and the output side lid 83*o*.

In the variable-speed accelerator 1 of the present embodiment, the constant-speed rotor 52, the variable-speed rotor 72, the constant-speed input shaft Ac, the variable-speed input shaft Av, and the output shaft Ao are arranged on the same axial line.

As shown in FIG. 1, the constant-speed electric motor 51 is set to rotate the constant-speed rotor 52 (internal gear 17)

in a first direction R1 in the peripheral direction of the axial line Ar by supplying electric power from the outside. As the constant-speed rotor 52 rotates in the first direction R1, the constant-speed input shaft Ac rotates in the first direction R1.

The output shaft Ao of the transmission device 10 is set to rotate in the first direction R1 by rotating the constant-speed rotor 52 of the constant-speed electric motor 51 in the first direction R1 at the maximum rotation speed. In other words, the forward rotation of the constant-speed electric motor 51 is in the first direction R1, and the forward rotation of the output shaft Ao of the transmission device 10 is in the first direction R1. The compressor C operates forwardly when the output shaft Ao rotates in the forward direction.

The variable-speed electric motor 71 can be rotationally driven in the first direction R1 and the second direction R2 in the peripheral direction of the axial line Ar of the variable-speed rotor 72. In other words, the variable-speed electric motor 71 can rotate forwardly and the reverse direction. By increasing the rotation speed of the variable-speed rotor 72 in the first direction R1, the rotation speed of the output shaft Ao of the transmission device 10 in the second direction R2 is increased.

The variable-speed electric motor 71 functions as a generator by generating electric power by rotating the variable-speed rotor 72 by an external force. A state where the variable-speed electric motor 71 functions as a generator is called a generator mode.

The variable-speed electric motor 71 functions as an electric motor by rotating the variable-speed rotor 72 when electric power is supplied. The state where the variable-speed electric motor 71 functions as an electric motor is called an electric motor mode.

The power supply portion 100 is electrically connected to the commercial power supply 200, the constant-speed electric motor 51, and the variable-speed electric motor 71. Therefore, as shown in FIG. 1, the power supply portion 100 supplies the electric power supplied from the commercial power supply 200 or the variable-speed electric motor 71 to the constant-speed electric motor 51 or the variable-speed electric motor 71. When the electric device 50 is started, the power supply portion 100 supplies the electric power required for starting the electric device 50, that is, the electric power of a constant rated frequency supplied from the commercial power supply 200, to the electric device 50 as the starting power. After this, the power supply portion 100 supplies the electric power generated by the variable-speed electric motor 71 in the generator mode to the constant-speed electric motor 51 during normal operation. The power supply portion 100 of the present embodiment includes an inverter 101, a first wiring 111, a second wiring 112, a third wiring 113, a first switch 121, a second switch 122, and a control device 150.

The inverter 101 converts the frequency of the electric power supplied from the commercial power supply 200 and the variable-speed electric motor 71 based on the instruction from the control device 150. The inverter 101 is connected to the commercial power supply 200. The inverter 101 generates, for example, three-phase AC power. The inverter 101 supplies starting power to the constant-speed electric motor 51 and the variable-speed electric motor 71 when starting the constant-speed electric motor 51 and the variable-speed electric motor 71. During normal operation after the completion of starting, the inverter 101 supplies driving power having a frequency different from the starting power only to the variable-speed electric motor 71 that performs the rated operation of the variable-speed electric motor 71.

Specifically, the inverter 101 supplies the electric power having the frequency instructed by the control device 150 to the variable-speed electric motor 71. The variable-speed rotor 72 of the variable-speed electric motor 71 rotates at a rotation speed that corresponds to this frequency. In this manner, the rotation speed of the variable-speed rotor 72 changes, the rotation speed of the variable-speed input shaft Av of the transmission device 10 connected to the variable-speed rotor 72 also changes. As a result, the rotation speed of the output shaft Ao of the transmission device 10 changes.

The first wiring 111 connects the inverter 101 and the variable-speed stator 86. The second wiring 112 branches from the first wiring 111 between the inverter 101 and the variable-speed electric motor 71. The second wiring 112 is connected to the first wiring 111 and the constant-speed stator 66. The third wiring 113 is connected to the commercial power supply 200 and the constant-speed stator 66. The third wiring 113 of the present embodiment is connected to the constant-speed stator 66 by joining the second wiring 112. The third wiring 113 directly supplies the electric power having a constant rated frequency supplied from the commercial power supply 200 to the constant-speed electric motor 51 without going through the inverter 101. From the third wiring 113, the electric power from the commercial power supply 200 is supplied to the constant-speed electric motor 51 as the driving power for rotating the constant-speed rotor 52 of the constant-speed electric motor 51 at a constant rotation speed.

The first switch 121 is disposed in the middle of the second wiring 112. The first switch 121 is capable of switching the supply state of the electric power from the inverter 101 to the constant-speed electric motor 51 between an ON state and an OFF state. In other words, when the first switch 121 is in the ON state, the electric power is supplied from the inverter 101 to the constant-speed electric motor 51 via the second wiring 112. Meanwhile, when the first switch 121 is in the OFF state, the electric power is cut off from the inverter 101 to the constant-speed electric motor 51 via the second wiring 112.

The second switch 122 is disposed in the middle of the third wiring 113. The second switch 122 is capable of switching between the ON state and the OFF state of supply state of the electric power from the commercial power supply 200 to the constant-speed electric motor 51. In other words, when the second switch 122 is in the ON state, the electric power is supplied from the commercial power supply 200 to the constant-speed electric motor 51 via the third wiring 113. Meanwhile, when the second switch 122 is in the OFF state, the electric power is cut off from the commercial power supply 200 to the constant-speed electric motor 51 via the third wiring 113.

Figure 3:
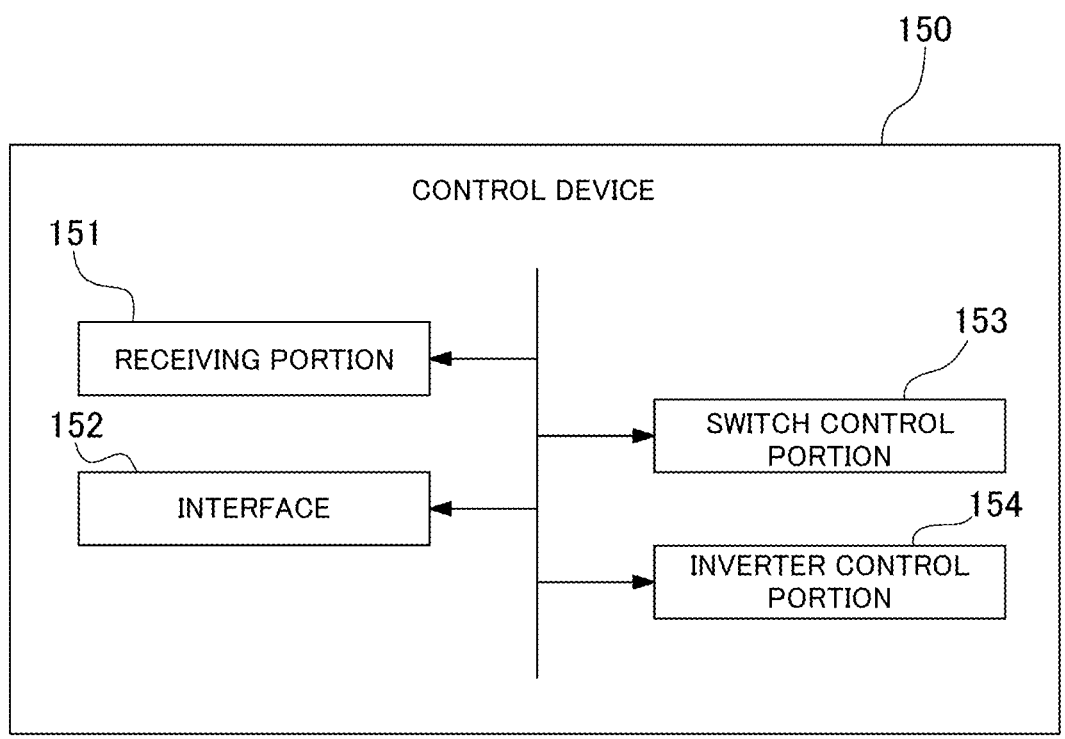
FIG. 3 is a functional block diagram of a control device for the variable-speed accelerator.

The control device 150 controls the power supply portion 100. The control device 150 of the present embodiment controls the operations of the inverter 101, the first switch 121, and the second switch 122. The control device 150 is configured with a computer. As shown in FIG. 3, the control device 150 includes a receiving portion 151, an interface 152, a switch control portion 153, and an inverter control portion 154.

The receiving portion 151 directly receives an instruction from the operator, or receives an instruction from the host control device. The interface 152 receives the instruction signal to the receiving portion 151 and transmits the instruction signal to the inverter 101, the first switch 121, and the second switch 122.

The switch control portion 153 controls the opening/closing operation of the first switch 121 and the second switch 122 in response to an instruction or the like received by the receiving portion 151.

The inverter control portion 154 controls the inverter 101 in response to an instruction or the like received by the receiving portion 151. The inverter control portion 154 changes the frequency of the electric power supplied from the commercial power supply 200. The constant-speed rotor 52 of the constant-speed electric motor 51 to which electric power is supplied from the inverter 101 and the variable-speed rotor 72 of the variable-speed electric motor 71 rotate at a rotation speed that corresponds to this frequency.

(Procedure of Method for Starting Variable-Speed Accelerator)

Figure 4:
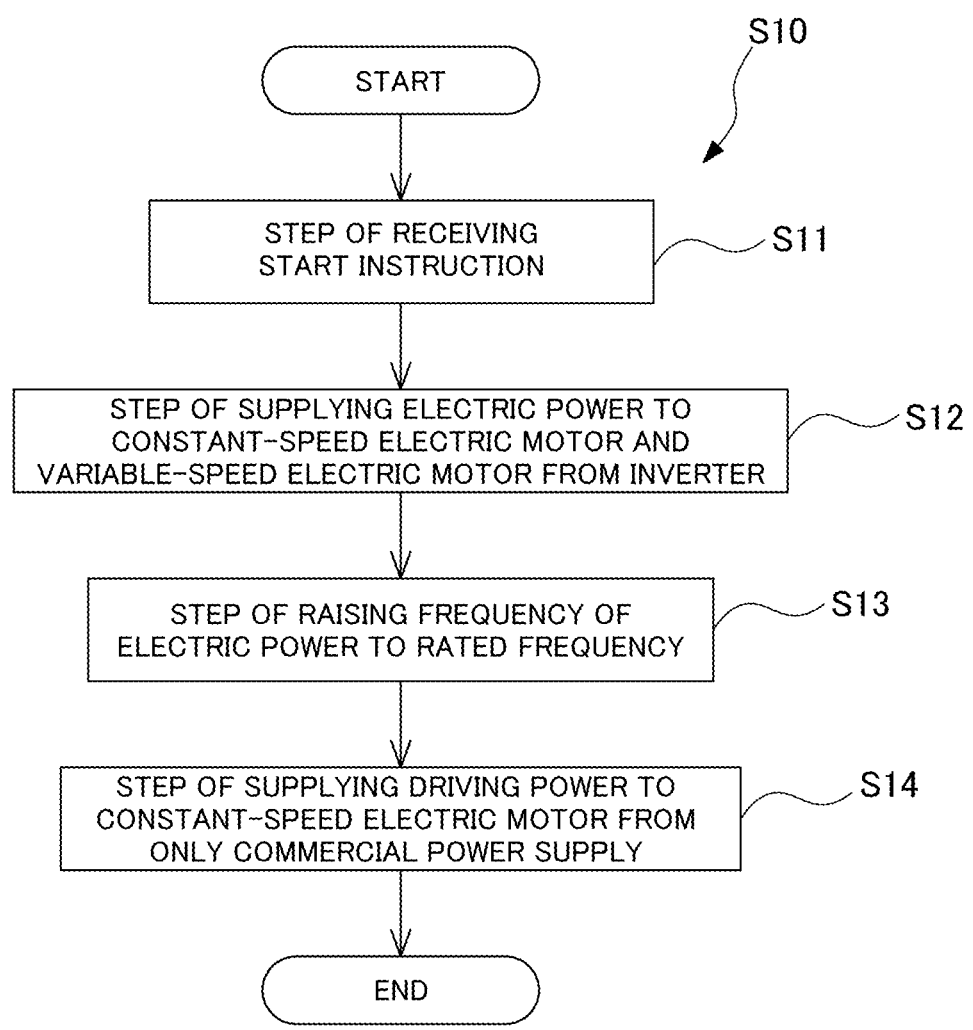
FIG. 4 is a flowchart showing a procedure of a method for starting a variable-speed accelerator according to the embodiment of the present disclosure.

Next, a method for starting a variable-speed accelerator of the present embodiment will be described. As shown in FIG. 4, a method S10 for starting of a variable-speed accelerator of the present embodiment includes a step S11 of receiving a start instruction; a step S12 of supplying electric power to the constant-speed electric motor and the variable-speed electric motor from an inverter; a step S13 of raising the frequency of the electric power to the rated frequency; and a step S14 of supplying the driving power to the constant-speed electric motor 51 from only the commercial power supply.

In the step S11 of receiving the start instruction, the receiving portion 151 receives an instruction to start the variable-speed accelerator 1 from the operator or the host control device. When the receiving portion 151 receives the start instruction, the process proceeds to step S12.

Figure 5:
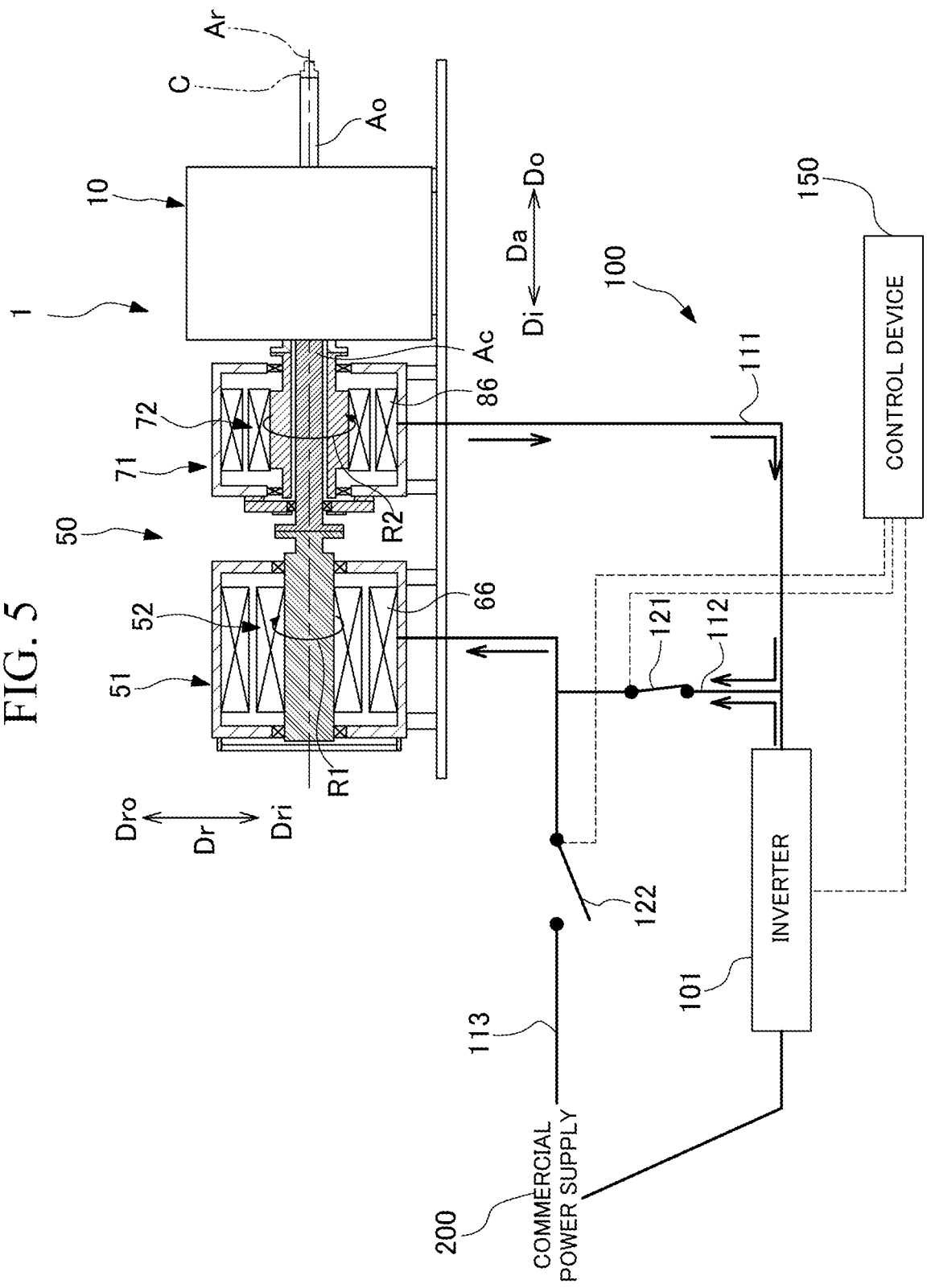
FIG. 5 is a view showing a step of supplying electric power from an inverter and a variable-speed electric motor to a constant-speed electric motor in the method for starting a variable-speed accelerator according to the embodiment of the present disclosure.

In the step S12 of supplying electric power from the inverter to the constant-speed electric motor and the variable-speed electric motor, after the electric power is supplied from the inverter 101 to the constant-speed electric motor 51 and the variable-speed electric motor 71, the electric power generated by the variable-speed electric motor 71 in the generator mode is supplied to the constant-speed electric motor 51. Specifically, as shown in FIG. 1, the first switch 121 is shifted to the ON state (closed state), and the second switch 122 is shifted to the OFF state (open state). In step S12, the electric power supplied from the commercial power supply 200 to the inverter 101 is supplied from the inverter 101 to the constant-speed electric motor 51 and the variable-speed electric motor 71 as starting power having a three-phase alternating current. The constant-speed rotor 52 and the variable-speed rotor 72 start to rotate due to the starting power supplied from the inverter 101. After this, when the variable-speed rotor 72 rotates, the variable-speed electric motor 71 is shifted to the generator mode, and electric power is generated. The electric power generated by the variable-speed electric motor 71 is regenerated to the constant-speed electric motor 51 via the first wiring 111 and the second wiring 112. Accordingly, as shown in FIG. 5, the constant-speed electric motor 51 is supplied with the electric power supplied from the inverter 101 and the regenerative electric power from the variable-speed electric motor 71. Therefore, the power supplied from the inverter 101 to the constant-speed electric motor 51 is reduced by the amount of the regenerative electric power from the variable-speed electric motor 71.

In step S13 of raising the frequency of the electric power to the rated frequency, the inverter control portion 154 controls the inverter 101 so as to raise the frequency of the electric power supplied from the inverter 101 to the constant-speed electric motor 51 and the variable-speed electric motor 71 at an appropriate rate (ramp rate). The inverter control portion 154 raises the frequency of the starting power supplied from the inverter 101 to the constant-speed electric motor 51 and the variable-speed electric motor 71 so as to synchronize with the rated frequency of the electric power supplied from the commercial power supply 200. When the frequency of the electric power supplied from the inverter 101 to the constant-speed electric motor 51 and the variable-speed electric motor 71 reaches the rated frequency, the frequency of the electric power supplied from the inverter 101 via the first wiring 111 and the second wiring 112 and the frequency of the electric power to be supplied from the commercial power supply 200 through the third wiring 113, are synchronized with each other.

Figure 6:
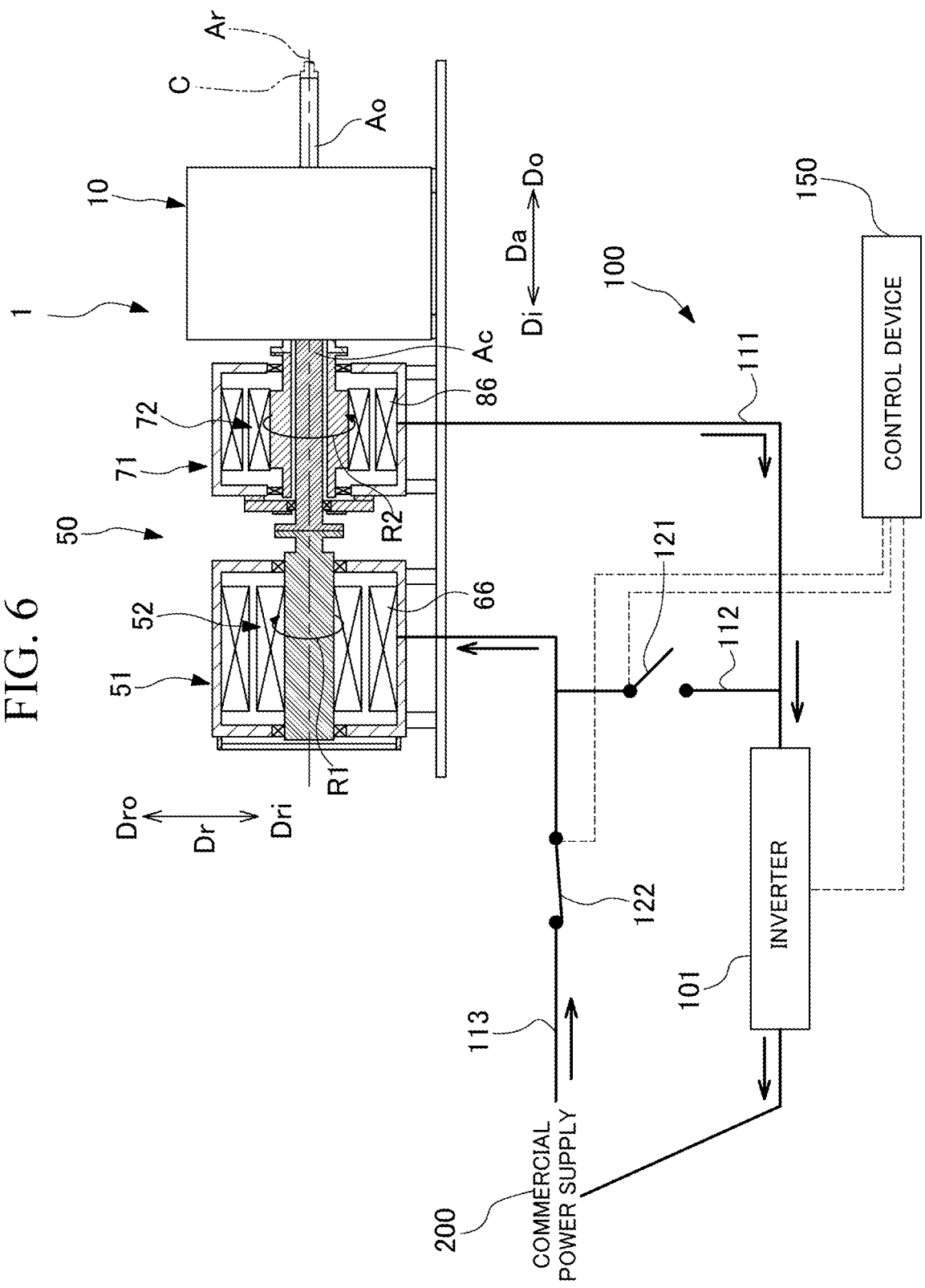
FIG. 6 is a view showing a step of supplying driving power from a commercial power supply to the constant-speed electric motor in the method for starting a variable-speed accelerator according to the embodiment of the present disclosure.

In the step S14 of supplying the driving power to the constant-speed electric motor 51 from only the commercial power supply 200, as illustrated in FIG. 6, the first switch 121 is shifted to the OFF state by the switch control portion 153. Accordingly, the supply of starting power from the inverter 101 to the constant-speed electric motor 51 is stopped. At the same time, the switch control portion 153 shifts the second switch 122 to the ON state. Accordingly, the electric power having a constant rated frequency is supplied to the constant-speed electric motor 51 from only the commercial power supply 200 through the third wiring 113 without going through the inverter 101. Meanwhile, the variable-speed electric motor 71 continues to operate in the generator mode, and the inverter 101 is supplied with electric power. In this state, the rated operation is continued.

(Effects)

In the variable-speed accelerator 1 having the above configuration and the method starting the same, when starting the electric device 50, first, starting power is supplied to the constant-speed electric motor 51 and the variable-speed electric motor 71 via the inverter 101. Accordingly, the variable-speed electric motor 71 is operated in the generator mode to generate electric power. The electric power generated by the variable-speed electric motor 71 is supplied to the constant-speed electric motor 51. Since the electric power generated by the variable-speed electric motor 71 is supplied to the constant-speed electric motor 51, the starting power supplied from the commercial power supply 200 to the constant-speed electric motor 51 via the inverter 101 is suppressed from reaching a level that exceeds the rated power. Therefore, it is possible to suppress an occurrence of a disturbance such as a voltage drop in the commercial power supply 200. As a result, when starting the variable-speed accelerator 1, it is possible to suppress an increase in the starting power and suppress the influence on the power supply system including the commercial power supply 200.

When the electric device 50 is started, the direct supply of electric power from the commercial power supply 200 to the constant-speed electric motor 51 can be cut off by shifting the second switch 122 to OFF state. In this state, when the first switch 121 is in the ON state, the electric power is supplied from the inverter 101 to the constant-speed electric motor 51 via the second wiring 112. Accordingly, starting power is supplied from the inverter 101 to the constant-speed electric motor 51 and the variable-speed electric motor 71 through the first wiring 111 and the second wiring 112. After the start of the electric device 50 is completed, the first switch 121 is shifted to the OFF state, and the supply of electricity from the inverter 101 to the constant-speed electric motor 51 is cut off. In this state, by shifting the second switch 122 to ON state, the driving power required for continuing the operation from the commercial power supply 200 is supplied to the constant-speed electric motor 51. The constant-speed rotor 52 can be rotationally driven at a constant-speed by the driving power having a constant rated frequency supplied from the commercial power supply 200. Meanwhile, the variable-speed electric motor 71 can control the rotation speed of the variable-speed rotor 72 by supplying the electric power controlled by the inverter 101. In this manner, it is possible to switch the power supply source at the time of starting the variable-speed accelerator 1 with a simple configuration.

Further, the inverter control portion 154 can synchronize the frequency of the electric power generated by the inverter 101 with the frequency of the driving power supplied from the commercial power supply 200 when the start of the electric device 50 is completed. Therefore, when the constant-speed electric motor 51 is switched to directly supply electric power from the commercial power supply 200 without going through the inverter 101, fluctuation of the rotation speed of the constant-speed rotor 52 can be suppressed. Accordingly, the power supply system can be switched smoothly.

Other Embodiments

Above, the embodiments of the present disclosure have been described in detail with reference to the drawings, but the specific configuration is not limited to the embodiments, and includes design changes and the like within a scope not departing from the gist of the present disclosure.

In the above-described embodiment, the configuration of each portion of the variable-speed accelerator 1 was described, but the configuration of each portion may be changed as appropriate. For example, the gear configuration of the transmission device 10 may be a configuration using any gear of the internal gear and the external gear.

<Additional Remarks>

The variable-speed accelerator 1 and the method for starting the variable-speed accelerator 1 described in the embodiment is grasped as follows, for example.

(1) The variable-speed accelerator 1 according to a first aspect including: the electric device 50 that generates a rotation driving force; the transmission device 10 that shifts the rotation driving force transmitted from the electric device 50 to the constant-speed input shaft Ac and the variable-speed input shaft Av and transmits the shifted rotation driving force to a driving target via the output shaft Ao; and the power supply portion 100 that supplies electric power having a constant rated frequency supplied from a power supply to the electric device 50 when the electric device 50 is started, in which the electric device 50 includes the constant-speed electric motor 51 having the constant-speed rotor 52 that rotates the constant-speed input shaft Ac of the transmission device 10, the variable-speed electric motor 71 that has the variable-speed rotor 72 connected to the variable-speed input shaft Av of the transmission device 10, functions as a generator in a generator mode, and functions as an electric motor in an electric motor mode, and the power supply portion 100 is connected to the constant-speed electric motor 51 and the variable-speed electric motor 71, and when the electric device 50 is started, the power supply portion 50 supplies electric power generated by the variable-speed electric motor 71 in the generator mode to the constant-speed electric motor 51, after starting power is supplied to the constant-speed electric motor 51 and the variable-speed electric motor 71.

In the variable-speed accelerator 1, when starting the electric device 50, first, the electric power is supplied to the constant-speed electric motor 51 and the variable-speed electric motor 71 via the power supply portion 100. Accordingly, the variable-speed electric motor 71 is operated in the generator mode to generate electric power. The electric power generated by the variable-speed electric motor 71 is supplied to the constant-speed electric motor 51. Since the electric power generated by the variable-speed electric motor 71 is supplied to the constant-speed electric motor 51, the power supplied from the power supply to the constant-speed electric motor 51 via the power supply portion 100 is suppressed from reaching a level that exceeds the rated power. Therefore, it is possible to suppress an occurrence of a disturbance such as a voltage drop in the power supply. As a result, when starting the variable-speed accelerator 1, it is possible to suppress an increase in the starting power and suppress the influence on the power supply system including the power supply.

(2) The variable-speed accelerator 1 according to a second aspect is the variable-speed accelerator 1 of (1), in which the power supply portion 100 includes the inverter 101 that is connected to the power supply and generates electric power to be supplied to the constant-speed electric motor 51 and the variable-speed electric motor 71, the first wiring 111 that connects the inverter 101 and the variable-speed electric motor 71, the second wiring 112 that branches from the first wiring 111 between the inverter 101 and the variable-speed electric motor 71 and is connected to the constant-speed electric motor 51, the first switch 121 disposed on the second wiring 112 and capable of switching a supply state of electric power from the inverter 101 to the constant-speed electric motor 51 between an ON state and an OFF state, the third wiring 113 that connects the power supply and the constant-speed electric motor 51, the second switch 122 disposed on the third wiring 113 and capable of switching a supply state of electric power from the power supply to the constant-speed electric motor 51 between an ON state and an OFF state, and the control device 150 for performing switching of the first switch 121 and the second switch 122, and when the control device 150 starts the electric device 50, the control device 150 switches the second switch 122 to the ON state and the first switch 121 to the OFF state after switching the first switch 121 to the ON state and the second switch 122 to the OFF state.

According to such a configuration, when the electric device 50 is started, the direct supply of electric power from the power supply to the constant-speed electric motor 51 can be cut off by shifting the second switch 122 to OFF state. In this state, when the first switch 121 is in the ON state, the electric power is supplied from the inverter 101 to the constant-speed electric motor 51 via the second wiring 112. Accordingly, starting power is supplied from the inverter 101 to the constant-speed electric motor 51 and the variable-speed electric motor 71 through the first wiring 111 and the second wiring 112. After the start of the electric device 50 is completed, the first switch 121 is shifted to the OFF state, and the supply of electricity from the inverter 101 to the constant-speed electric motor 51 is cut off. In this state, by shifting the second switch 122 to ON state, the driving power required for continuing the operation from the power supply is supplied to the constant-speed electric motor 51. The constant-speed rotor 52 can be rotationally driven at a constant-speed by the driving power having a constant rated frequency supplied from the power supply. Meanwhile, the variable-speed electric motor 71 can control the rotation speed of the variable-speed rotor 72 by supplying the electric power controlled by the inverter 101. In this manner, it is possible to switch the power supply source at the time of starting the variable-speed accelerator 1 with a simple configuration.

(3) The variable-speed accelerator 1 according to a third aspect is the variable-speed accelerator 1 of (2), in which when a frequency of the electric power generated by the inverter 101 is synchronized with a frequency of driving power supplied from the power supply, the control device 150 switches the second switch 122 from the OFF state to the ON state and the first switch 121 from the ON state to the OFF state.

Accordingly, when the constant-speed electric motor 51 is switched to directly supply electric power from the power supply without going through the inverter 101, fluctuation of the rotation speed of the constant-speed rotor 52 can be suppressed. Therefore, the power supply system can be switched smoothly.

(4) A method S10 for starting the variable-speed accelerator 1 according to a fourth aspect is a method S10 for starting the variable-speed accelerator 1 according to any one of (1) to (3), the method including: a step of supplying electric power generated by the variable-speed electric motor 71 in the generator mode to the constant-speed electric motor 51, after supplying the electric power to the constant-speed electric motor 51 and the variable-speed electric motor 71 from the power supply portion 100; and a step of supplying the electric power to the constant-speed electric motor 51 from only the power supply.

Accordingly, since the electric power generated by the variable-speed electric motor 71 is supplied to the constant-speed electric motor 51, the power supplied from the power supply to the constant-speed electric motor 51 via the power supply portion 100 is suppressed from reaching a level that exceeds the rated power. Therefore, it is possible to suppress occurrence of disturbance such as a voltage drop in the power supply. As a result, when starting the variable-speed accelerator 1, it is possible to suppress an increase in the starting power and suppress the influence on the power supply system including the power supply.

EXPLANATION OF REFERENCES

1 Variable-speed accelerator
10 Transmission device
50 Electric device
51 Constant-speed electric motor
51S Constant-speed electric motor support portion
52 Constant-speed rotor
53 Constant-speed rotor shaft
56 Conductor
61 Constant-speed electric motor casing
62 Constant-speed electric motor casing main body
63i, 63o Lid
65i Constant-speed rotor bearing
65o Constant-speed rotor bearing
66 Constant-speed stator
71 Variable-speed electric motor
71S Variable-speed electric motor support portion
72 Variable-speed rotor
73 Variable-speed rotor shaft
73o Flange
74 Shaft insertion hole
76 Conductor
81 Variable-speed electric motor casing
82 Variable-speed electric motor casing main body
83i Inlet side lid
83o Output side lid
85i Variable-speed rotor bearing
85o Variable-speed rotor bearing
86 Variable-speed stator
90 Frame
100 Power supply portion
101 Inverter
111 First wiring
112 Second wiring
113 Third wiring
121 First switch
122 Second switch
150 Control device
151 Receiving portion
152 Interface
153 Switch control portion
154 Inverter control portion
200 Commercial power supply
Ac Constant-speed input shaft
Ao Output shaft
Ar Axial line
Av Variable-speed input shaft
C Compressor
Da Axial direction
Di Input side
Do Output side
Dr Radial direction
Dri Inner side
Dro Outer side
R1 First direction
R2 Second direction
S10 Method for starting variable-speed accelerator
S11 Step of receiving start instruction
S12 Step of supplying electric power from inverter to constant-speed electric motor and variable-speed electric motor
S13 Step of raising frequency of electric power to rated frequency
S14 Step of supplying electric power to constant-speed electric motor from only power supply

What is claimed is:

1. A variable-speed accelerator comprising:
an electric device that configured to generate a rotation driving force;
a transmission device that configured to shift the rotation driving force transmitted from the electric device to a constant-speed input shaft and a variable-speed input shaft and configured to transmit the shifted rotation driving force to a driving target via an output shaft; and
a power supply portion that configured to supply electric power having a constant rated frequency supplied from a power supply to the electric device when the electric device is started, wherein
the electric device includes:
    a constant-speed electric motor having a constant-speed rotor that configured to rotate the constant-speed input shaft of the transmission device;
    a variable-speed electric motor that has a variable-speed rotor connected to the variable-speed input shaft of the transmission device, functions as a generator in a generator mode, and functions as an electric motor in an electric motor mode,
the power supply portion is connected to the constant-speed electric motor and the variable-speed electric motor, and when the electric device is started, the power supply portion supplies electric power generated by the variable-speed electric motor in the generator mode to the constant-speed electric motor, after starting power is supplied to the constant-speed electric motor and the variable-speed electric motor,
the power supply portion includes:

an inverter that is connected to the power supply and configured to generate electric power to be supplied to the constant-speed electric motor and the variable-speed electric motor;
a first wiring that connects the inverter and the variable-speed electric motor;
a second wiring that branches from the first wiring between the inverter and the variable-speed electric motor and is connected to the constant-speed electric motor;
a first switch disposed on the second wiring and capable of switching a supply state of electric power from the inverter to the constant-speed electric motor between an ON state and an OFF state;
a third wiring that connects the power supply and the constant-speed electric motor;
a second switch disposed on the third wiring and capable of switching a supply state of electric power from the power supply to the constant-speed electric motor between an ON state and an OFF state; and
a control device configured to switch between the first switch and the second switch, and
when the electric device is started, the control device switches the second switch to the ON state and the first switch to the OFF state after switching the first switch to the ON state and the second switch to the OFF state.

2. The variable-speed accelerator according to claim 1, wherein, when a frequency of the electric power generated by the inverter is synchronized with a frequency of driving power supplied from the power supply, the control device switches the second switch from the OFF state to the ON state and the first switch from the ON state to the OFF state.

\* \* \* \* \*